V. C. MILLER.
SHUTTER FOR AUTOMOBILE RADIATORS.
APPLICATION FILED JUNE 19, 1919.

1,355,411.

Patented Oct. 12, 1920.

Inventor
Valie C. Miller,

By C. L. Parker.
Attorney

Witnesses

UNITED STATES PATENT OFFICE.

VALIE C. MILLER, OF ALLEN TOWNSHIP, OTTAWA COUNTY, OHIO.

SHUTTER FOR AUTOMOBILE-RADIATORS.

1,355,411. Specification of Letters Patent. Patented Oct. 12, 1920.

Application filed June 19, 1919. Serial No. 305,268.

*To all whom it may concern:*

Be it known that I, VALIE C. MILLER, a citizen of the United States, residing at Allen township, in the county of Ottawa and State of Ohio, have invented certain new and useful Improvements in Shutters for Automobile-Radiators, of which the following is a specification.

This invention relates to new and useful improvements in shutters for automobile radiators, and has for its object the provision of a shutter readily adjustable and by which the air passing through the radiator may be controlled.

I am aware that similar shutters have been provided wherein all of the shutter members are operated at the same time. This forms a disadvantage in that in cold weather it would be desirable to have a certain amount of air passing through the radiator but at the same time it is undesirable to have the entire radiator exposed. As is well known the heated water from the engine enters at the top of the radiator and a few of the shutter members being open at this point are sufficient in cold weather to cool the water. In my device each of the shutter members is separably operable and may be secured in open position whereby the driver may regulate the amount of air to just sufficiently cool the water to cause the engine to act properly.

Other objects and advantages of the invention will be apparent during the course of the following description.

Figure 1:
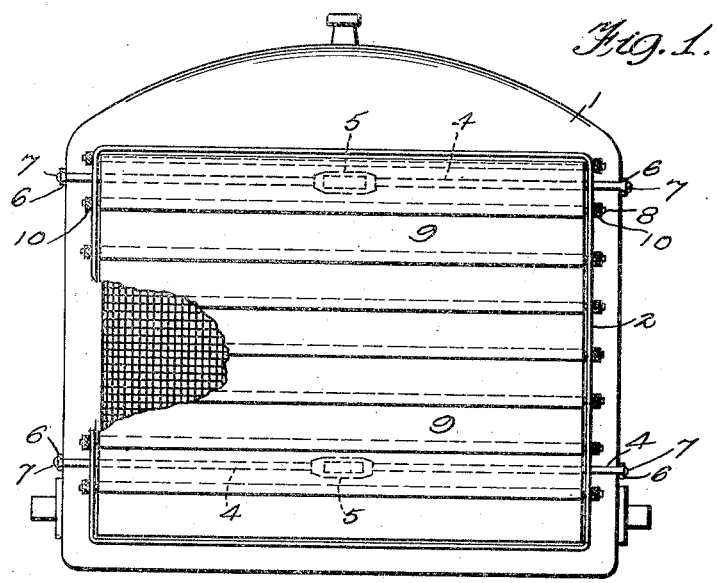
Figure 2:
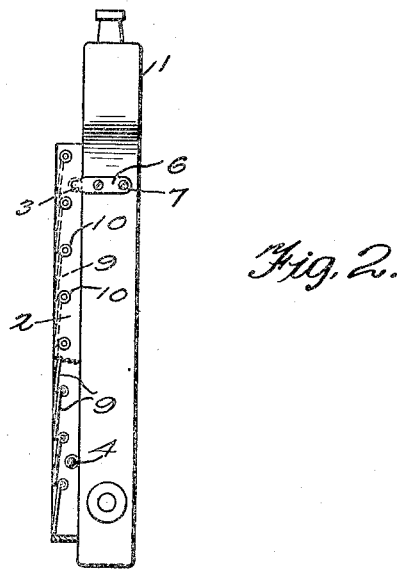

In the accompanying drawings forming a part of this specification, and in which like numerals are employed to designate like parts throughout the same:

Figure 1 is a front elevation of a radiator with my shutter applied, portions of the shutter being broken away; and Fig. 2 is a side elevation thereof.

In the drawings, wherein for the purpose of illustration is shown a preferred embodiment of my invention, the numeral 1 designates the radiator of an automobile. Secured to the radiator is a rectangular frame 2 having openings 3 formed in the side walls thereof. Mounted within these openings are rods 4. These rods each have their ends 6 bent at right angles and provided with openings to receive screws 7 for the purpose of attaching the rods to the radiator. These rods are connected by a turn-buckle 5, permitting adjustment to fit the radiator.

Rotatably mounted in the frame 2 are rods 8 having secured thereto shutter members 9. The outer ends of the rods 8 project through the frame and are screw threaded to receive the milled nuts 10.

It will readily be seen that by loosening the nuts 10 of any of the rods 8, the shutter member 9 secured thereto may be open and secured in open position by again tightening the nuts.

It is to be understood that the form of my invention herewith shown and described is to be taken as the preferred example of the same, and that various changes in the shape, size and arrangement of parts may be resorted to without departing from the spirit of the invention or the scope of the subjoined claim.

Having thus described my invention, I claim:

The combination with an automobile radiator, of shutter mechanism therefor, said shutter mechanism comprising a substantially rectangular frame, adjustable rods secured to the frame, said rods having their terminals extended at an angle and adapted to be secured to the radiator, a plurality of shutter carrying rods rotatably mounted in the frame, the ends of the rods projecting beyond the frame, shutter members mounted on said carrying rods, and nuts mounted on the ends of said rods.

In testimony whereof I affix my signature in presence of two witnesses.

VALIE C. MILLER.

Witnesses:
A. F. CAMP,
W. S. RHODERT.